(12) United States Patent
Karabey et al.

(10) Patent No.: US 8,353,045 B2
(45) Date of Patent: Jan. 8, 2013

(54) METHOD AND TOOL FOR INFORMATION SECURITY ASSESSMENT THAT INTEGRATES ENTERPRISE OBJECTIVES WITH VULNERABILITIES

(76) Inventors: Bugra Karabey, Ankara (TR); Nazife Baykal, Ankara (TR)

( * ) Notice: Subject to any disclaimer, the term of this patent is extended or adjusted under 35 U.S.C. 154(b) by 613 days.

(21) Appl. No.: 12/493,799

(22) Filed: Jun. 29, 2009

(65) Prior Publication Data
US 2010/0333002 A1    Dec. 30, 2010

(51) Int. Cl.
*G06F 21/00* (2006.01)
(52) U.S. Cl. ............................. 726/25; 726/22
(58) Field of Classification Search ............. 726/25, 726/22
See application file for complete search history.

(56) References Cited

U.S. PATENT DOCUMENTS

| | | | |
|---|---|---|---|
| 6,249,768 B1* | 6/2001 | Tulskie et al. ............... | 705/7.36 |
| 2005/0138413 A1* | 6/2005 | Lippmann et al. ............ | 713/201 |
| 2005/0193430 A1* | 9/2005 | Cohen et al. ................ | 726/25 |
| 2006/0200477 A1* | 9/2006 | Barrenechea ................ | 707/100 |
| 2010/0082513 A1* | 4/2010 | Liu ............................. | 706/46 |

OTHER PUBLICATIONS

Barney et al., "Strategic Management and Competitive Advantage—Concepts and Cases", published by Prentice Hall, ISBN 0-13-154274-5, chapters 1-3, 2006.*
Clark et al., "Security Risk Metrics: Fusing Enterprise Objectives and Vulnerabilities", Proceeding of the 2005 IEEE Workshop on Information Assurance and Security, pp. 388-393, 2005.*

* cited by examiner

*Primary Examiner* — William Goodchild
(74) *Attorney, Agent, or Firm* — Collen IP; Donald J. Ranft (57) ABSTRACT

In one aspect, a method to assess information security vulnerability of an enterprise includes storing enterprise objectives in a computer system, storing enterprise resources determined using a value criterion, a rareness criterion, an inimitability criterion and a non-substitutability criterion in the computer system and storing enterprise information assets in the computer system. The method also includes mapping the enterprise objectives with the enterprise resources and mapping the enterprise information assets with the enterprise resources. The method further includes determining a threat analysis using an attack tree using the enterprise resources and the information assets and determining a risk value using the attack tree.

18 Claims, 7 Drawing Sheets

METHOD AND TOOL FOR INFORMATION SECURITY ASSESSMENT THAT INTEGRATES ENTERPRISE OBJECTIVES WITH VULNERABILITIES

BACKGROUND

As it is impossible to eliminate all the risks, organizations may hope that a perceived risk can be reduced if risk advice can be obtained through a risk assessment. Therefore, risk management plays a critical role in protecting an organization's information assets. Risk management is a process that covers both an assessment phase and a mitigation phase. In the assessment phase adequate methods and tools are required to determine quantitative results. In the traditional approaches the probability of occurrence of a risk is multiplied by its perceived impact to form a loss expectancy figure.

In the domain of information systems and information security management the risk assessment phase is more complicated. As information security threats are constantly evolving, use of historical or statistical figures to estimate the probability of occurrence of a specific risk may present in faulty conclusions. Currently, data repositories like the National Vulnerability Database by National Institute of Standards and Technology (NIST) are used. In some examples, available automated tools are used to determine vulnerability assessments. Most of the time, these measures tend to be geared toward security professionals and usually are not suitable for managerial decision making, which are commonly driven by compliance requirements rather than the risk management thought processes. Suitable outcomes are expected from such tools and methods to help management make decisions, prioritize resources and develop mitigation strategies against the occurrence of such risks related with the information assets of a company, however most of the time that is not the case.

U.S. National Security Agency (NSA)'s Mission Oriented Risk and Design Analysis (MORDA) provides a framework for analyzing complex information security risk postures. MORDA combines threat, attack and mission impact concepts to derive an unbiased risk metric, so the enterprise objectives in the form of missions are embedded within this framework. Identification of enterprise objectives has not been defined explicitly within MORDA.

Another critical aspect of information security threats is their ever changing nature that evolves at a tremendous pace. In addition to that the interconnected nature of information assets presents an additional dimension of complexity in the form of a requirement for cascaded and parallel analysis of threats against the information assets.

The attack tree approach is suitable to address such architectural complexities in a dynamic manner. Attacks are modeled through the use of a graphical, mathematical, decision tree structure called an attack tree. Similar studies exist that utilize attack graphs instead of attack trees. A known issue with attack trees (and graphs) is that for systems that include numerous information resource elements the task becomes cumbersome and the scalability of the approach becomes limited within large enterprises.

SUMMARY

In one aspect, a method to assess information security vulnerability of an enterprise includes storing enterprise objectives in a computer system, storing enterprise resources determined using a value criterion, a rareness criterion, an inimitability criterion and a non-substitutability criterion in the computer system and storing enterprise information assets in the computer system. The method also includes mapping the enterprise objectives with the enterprise resources and mapping the enterprise information assets with the enterprise resources. The method further includes determining a threat analysis using an attack tree using the enterprise resources and the information assets and determining a risk value using the attack tree.

In another aspect, an article includes a machine-readable storage medium that stores executable instructions to assess information security vulnerability of an enterprise. The instructions causes a machine to store enterprise objectives in a computer system, store enterprise resources determined using a value criterion, a rareness criterion, an inimitability criterion and a non-substitutability criterion in the computer system and store enterprise information assets in the computer system. The instructions also cause machine to map the enterprise objectives with the enterprise resources and map the enterprise information assets with the enterprise resources. The instructions further cause a machine to determine a threat analysis using an attack tree by using the enterprise resources and the information assets and determine a risk value using the attack tree.

In a further aspect, an apparatus to assess information security vulnerability of an enterprise includes circuitry to store enterprise objectives in a computer system, store enterprise resources determined using a value criterion, a rareness criterion, an inimitability criterion and a non-substitutability criterion in the computer system, store enterprise information assets in the computer system, map the enterprise objectives with the enterprise resources, map the enterprise information assets with the enterprise resources, determine a threat analysis using an attack tree using the enterprise resources and the information assets and determine a risk value using the attack tree.

DETAILED DESCRIPTION

Security is one of the key concerns in the domain of information technology (IT) systems. Maintaining the confidentiality, integrity and availability of IT systems, mandates a rigorous prior analysis of the security risks that confront the IT systems. In order to analyze, mitigate and recover from the security risks, a metrics-based approach is essential in prioritizing the response strategies to the security risks and is used for resource allocation schedules to mitigate the security risks. As will be described herein, enterprise objectives are focally integrated in the definition, impact calculation and prioritization phases of the analysis to determine metrics that are useful both for the technical and managerial communities within an enterprise. The inclusion of enterprise objectives in the identification of information assets acts as a preliminary filter to overcome the real-life scalability issues inherent with such threat modeling efforts. An attack-tree-based approach can be utilized to offer an information security tool and method that integrates the enterprise objectives with the information asset vulnerabilities within an enterprise.

Existing tools and methods in the field of information security risk assessment suffer from certain issues. Due to the limited availability of statistics in the area of IT security, probabilistic calculations and methodologies that rely upon historical data may not be reliable. Also, due to the evolving nature of IT security threats and vulnerabilities, there may be asymmetric or non-linear leaps in the threat domain, compared to the traditional defense systems, so that the threats are dynamic in nature, which necessitates a dynamic modeling step within the methodology. In addition when the impact account is accounted for, it is evident that intangible components of the assets are at risk also. Thus, taking into account the technical level or pure monetary losses will not cover all situations. Therefore, business goals and priorities are accounted for as described herein leading to a solution having a scalability (and usability) within real life enterprise settings and scenarios.

As described herein, a methodology, which utilizes Resource Based View (RBV) model of enterprises in the fundamental phases of the method, is used to identify the resources essential for an enterprise's success in line with objectives. The methodology further maps these resources and thus the enterprise objectives with the information assets domain. The resources and related assets are analyzed from the information security threats perspective. The resource-based view of an enterprise identifies enterprises as collections of tangible and intangible resources combined with capabilities to utilize these assets to finally develop competencies that result in competitive advantage. Until now it has not been used within the context of information security risk tools and methodologies.

System security risks are of a complicated nature which can only be evaluated by considering a complex combination of possible consequences. Attack trees are well suited and frequently used for this pursuit, so that attack tree modeling are utilized in the information asset and threat modeling stage as described herein. A purpose of the attack tree is to define and analyze possible attacks on a system in a structured way that is modeled within a tree structure including a nodal hierarchy that allows the decomposition and analysis of an attack within a number of attack steps.

Thus, the inclusion of the enterprise objectives enables results to be determined that will be inherently relevant to the decision making and execution steps of management. Identified resources through the resource based view constitute the root nodes of the attack tree and the related information assets and the steps of the threat scenario against these form the leaves of the attack tree. In addition, the techniques described herein will overcome the scalability issues with using the attack trees at the modeling and attack generation phases by prioritizing and focusing on the most critical information assets by the identification of these assets through a methodology that embeds and puts the enterprise objectives at the forefront of the system modeling and information asset definition phases.

Therefore, the usage of the resource-based view enables integration of enterprise objectives with vulnerabilities presents useful results for the management and resolves the scalability issues inherent with the attack tree modeling of information security threats.

Figure 1:
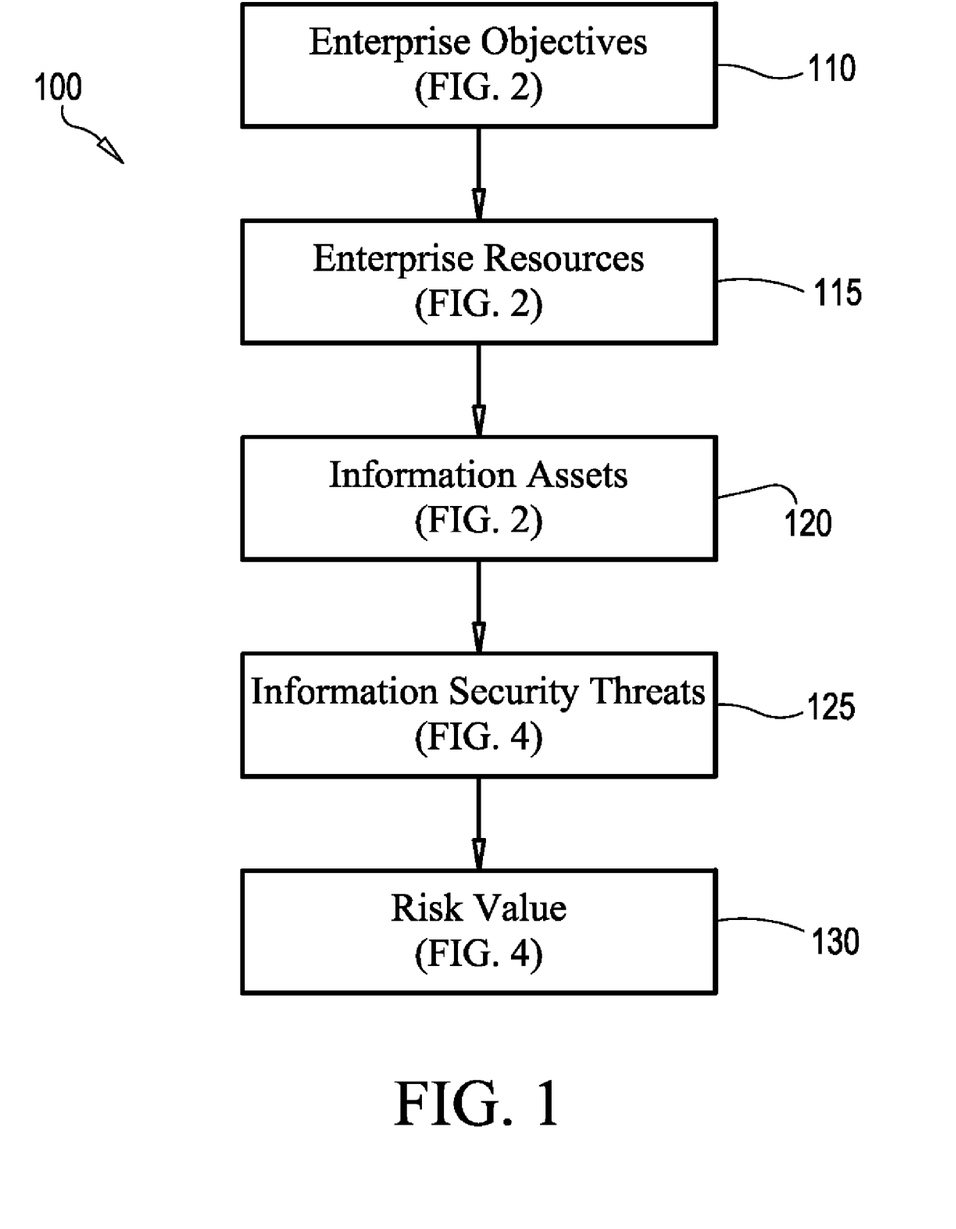
FIG. 1 is a flowchart of an example of a process to assess information security vulnerability.

Referring to FIG. 1, a process 100 is an example of a process to assess information security vulnerability. As used herein an enterprise is any organization such as a business, a military unit, a club and so forth utilizing information assets (e.g., information technology (IT)). Enterprise objectives are either defined within mission statements and/or goals of an organization or can be compiled through discussions with the top level management of the company (110). Enterprise resources are identified, for example, through a rigorous resource-based modeling of the enterprise (115) (e.g., as described in FIGS. 2 to 4). Enterprise resources are based upon the relevant information assets that are identified (120) (e.g., as described in FIGS. 2 to 4). After the identification of the enterprise objectives, the enterprise resources, the information assets and a mapping of these elements to each other, a refined list and model is achieved that can be focused to determine information security (i.e., a threat analysis) (125). In one example, by using an attack tree methodology, a resultant quantitative risk figure (i.e., a resultant risk value) is determined (130).

Figure 2:
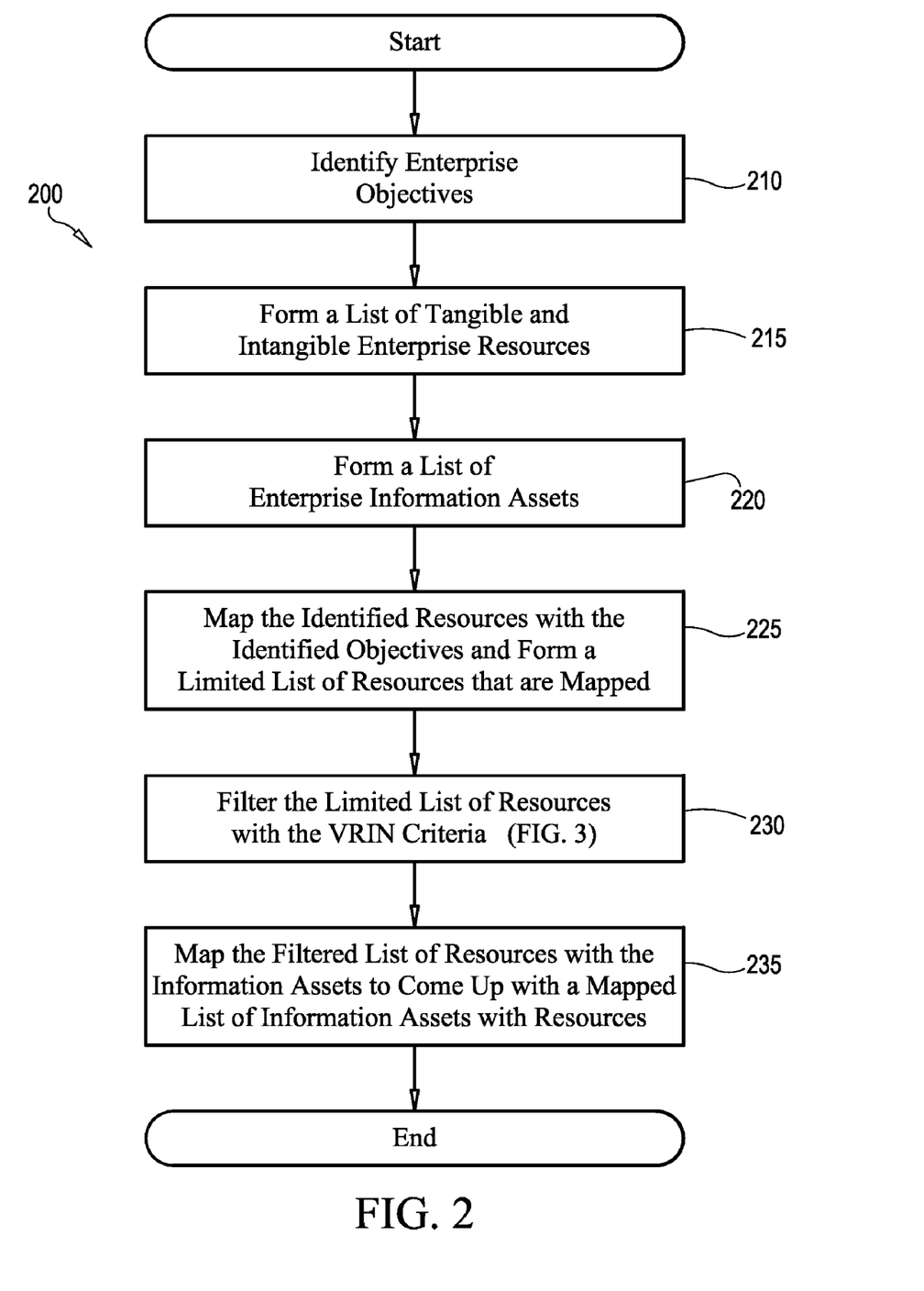
FIG. 2 is a flowchart of an example of a process to determine and map enterprise objectives, resources and information assets.

Referring to FIG. 2, a process 200 is an example of a process to determine and map enterprise objectives, resources and information assets. Enterprise objectives such as missions and goals are compiled (210). A team, for example, that includes an enterprise's top management and functional managers (e.g., sales, marketing, finance, technical, logistics and so forth) determine a list of tangible and intangible enterprise resources, which are stored into a system (e.g., a computer 700 (FIG. 7)) (215) to determine risk.

A list of enterprise information assets is defined by the information systems team in the enterprise and stored in the system (e.g., the computer 700 (FIG. 7)) (220). The identified resources are mapped with the identified objectives to form a limited list of resources that are mapped with the enterprise objectives (225). For example, the identified objectives are matched with the identified resources that are relevant for the successful achievement of the objectives. In one particular example, a list of resources that are deemed critical for the related objective is compiled for every objective.

A value, rareness, inimitability, non-substitutability (VRIN) criteria test is used to refine and filter the enterprise resources to include enterprise resources that are relevant to the proper and successful functioning of the enterprise (230). The VRIN criteria are based upon the resource-based view of the enterprise and define differentiating, competitive and advantageous resources of the enterprise.

The filtered list of enterprise resources are mapped with the relevant information assets from the identified list of assets defined in processing block 220 to form a mapped list of information assets with the critical resources (235). For example, the identified enterprise resources are matched with the identified assets that are relevant for the proper functioning of the resource. In one particular example, a list of assets that are deemed critical for the related enterprise resource is compiled for each resource.

Figure 3:
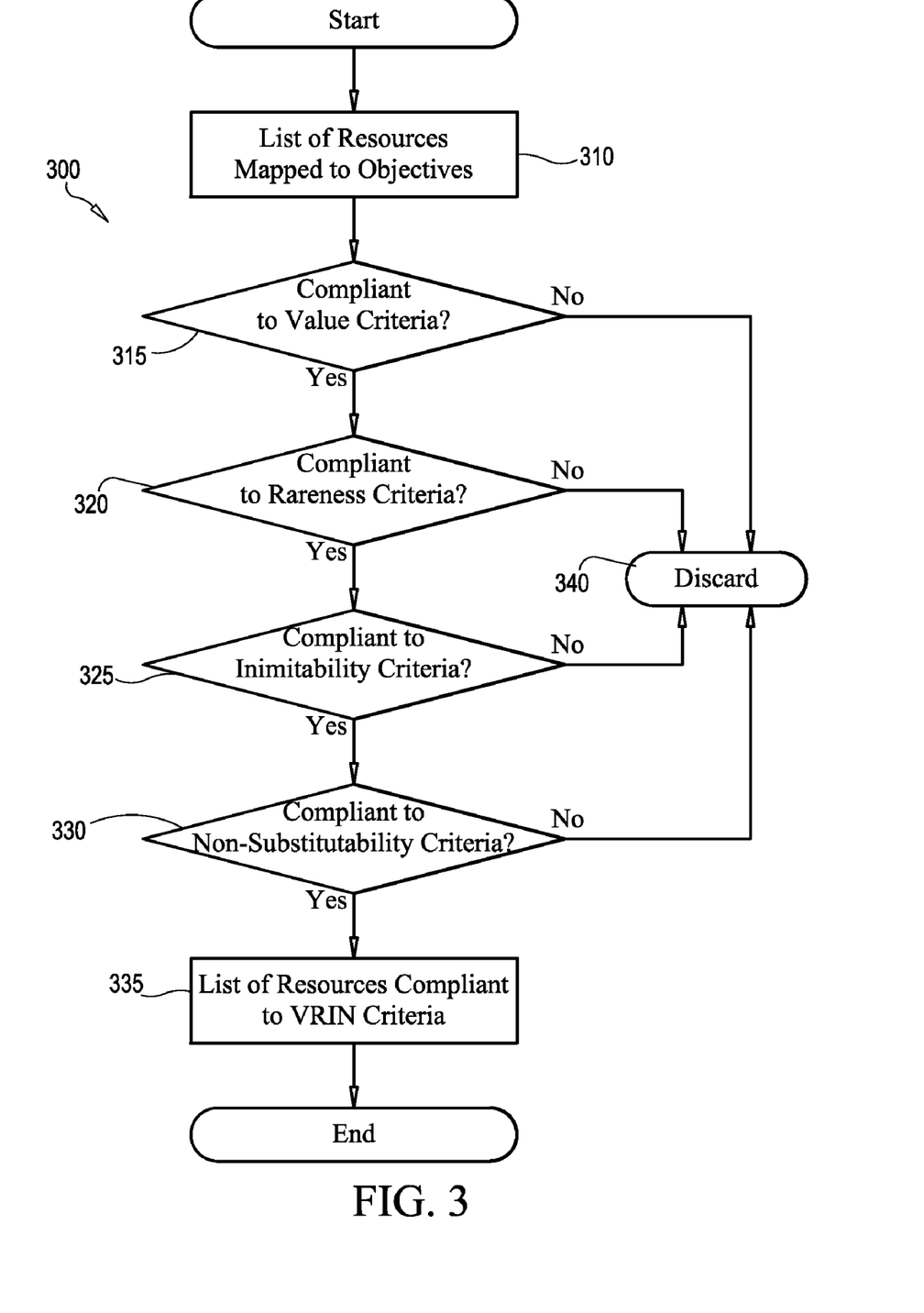
FIG. 3 is a flowchart of an example of a process to perform a value, rareness, inimitability and non-substitutability (VRIN) criteria filtering of the enterprise assets.

Referring to FIG. 3, an example of a process to filter a list of resources (processing block 230) is a process 300. The list of enterprise resources mapped to the enterprise objectives (see processing block 225) are used (310).

For each enterprise resource, the enterprise resource is evaluated against a value criterion (310). The value criterion defines that an enterprise's resources are valuable if they enable the enterprise to implement strategies that improve its efficiency and effectiveness. In one particular example, the value criterion is a Boolean and/or qualitative criterion that has a PASS/FAIL or COMPLIANT/NON-COMPLIANT value. Thus, the enterprise resources that fail the value criterion are discarded 340.

The enterprise resources that pass the value criterion are further evaluated against a rareness criterion (320). The rareness criterion from the resource-based view paradigm indicates that an enterprise has a competitive advantage if the same advantage is not shared by another enterprise. In one particular example, the rareness criterion is a Boolean and/or qualitative criterion that has a PASS/FAIL or COMPLIANT/NON-COMPLIANT value. Thus, the rarity of the enterprise resource is a decisive criterion for it to be accepted. Thus, the enterprise resources that fail the rareness criterion are discarded 340.

The enterprise resources that pass the rareness criterion are further evaluated against an inimitability criterion (325). The inimitability criterion indicates that in order to offer a sustainable advantage an enterprise resource is harder for a competing enterprise to imitate. In one particular example, the inimitability criterion is a Boolean and/or qualitative criterion that has a PASS/FAIL or COMPLIANT/NON-COMPLIANT value. For example, a low inimitability limit also lowers the mobility or increases the time for the enterprise resource to be copied. The enterprise resources that fail the inimitability criterion are discarded 340.

The enterprise resources that pass the inimitability criterion are further evaluated against a non-substitutability criterion (330). The non-substitutability criterion from the resource-based view thinking indicates that enterprise resources that are critical do not have equivalent enterprise resources (e.g., with a lower rareness criterion value or an inimitability criterion value) that can be substituted for them. For example, existence of such substitute enterprise resources voids the importance that the particular enterprise resource presents. The enterprise resources that fail the non-substitutability criterion are discarded 340 and the enterprise resources that pass the non-substitutability criterion form the filtered/refined list of enterprise resources.

In processing block 235, the enterprise resources that are refined and filtered in the VRIN analysis are mapped with the information assets defined in the processing block 220 to form a mapped list of information assets with the enterprise resources.

Figure 4:
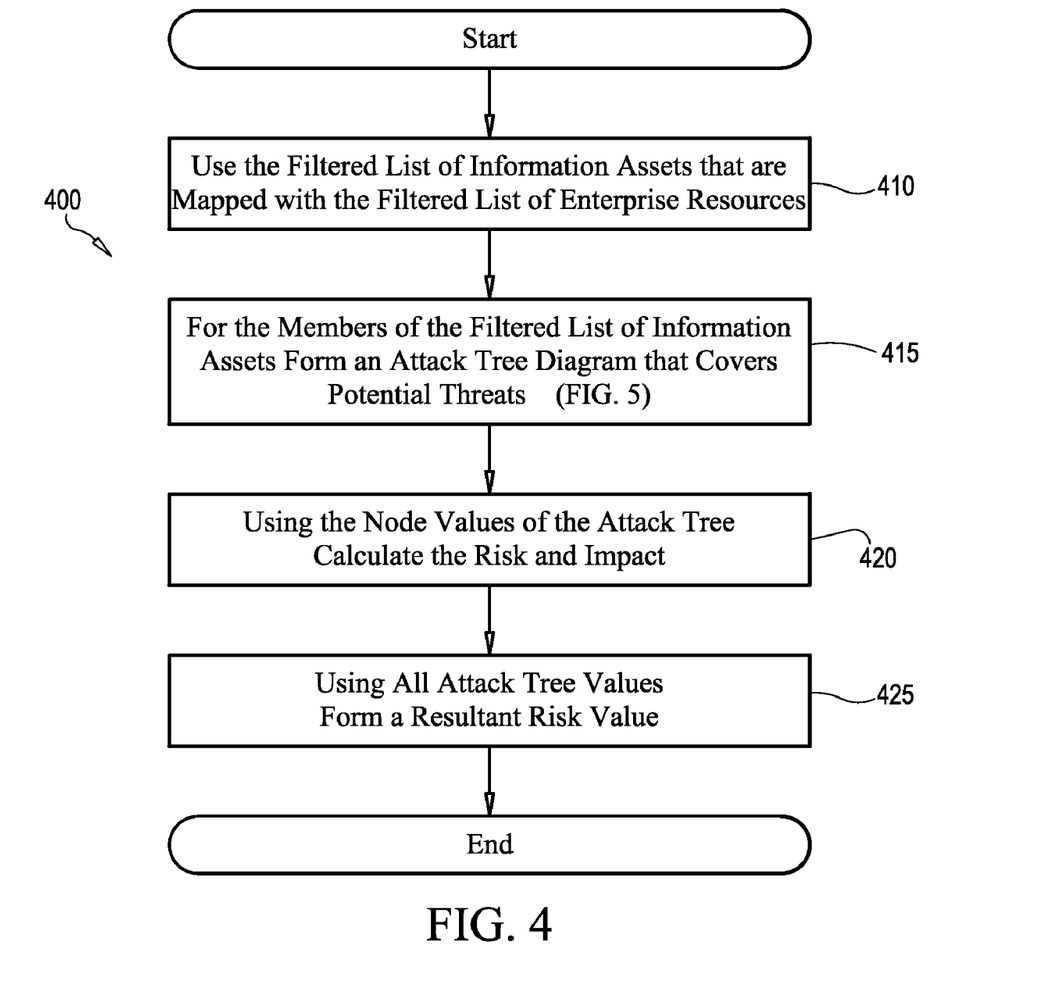
FIG. 4 is a flowchart of an example of a process to determine a risk value.

Referring to FIG. 4, a process 400 is an example of a process to determine a risk value. In the threat modeling, the outcome of processing block 235 is used (410). The threats and threat scenarios that include a succession of serial and/or parallel steps of hostile moves that may jeopardize a specific enterprise resource are modeled using an attack tree (415).

Figure 5:
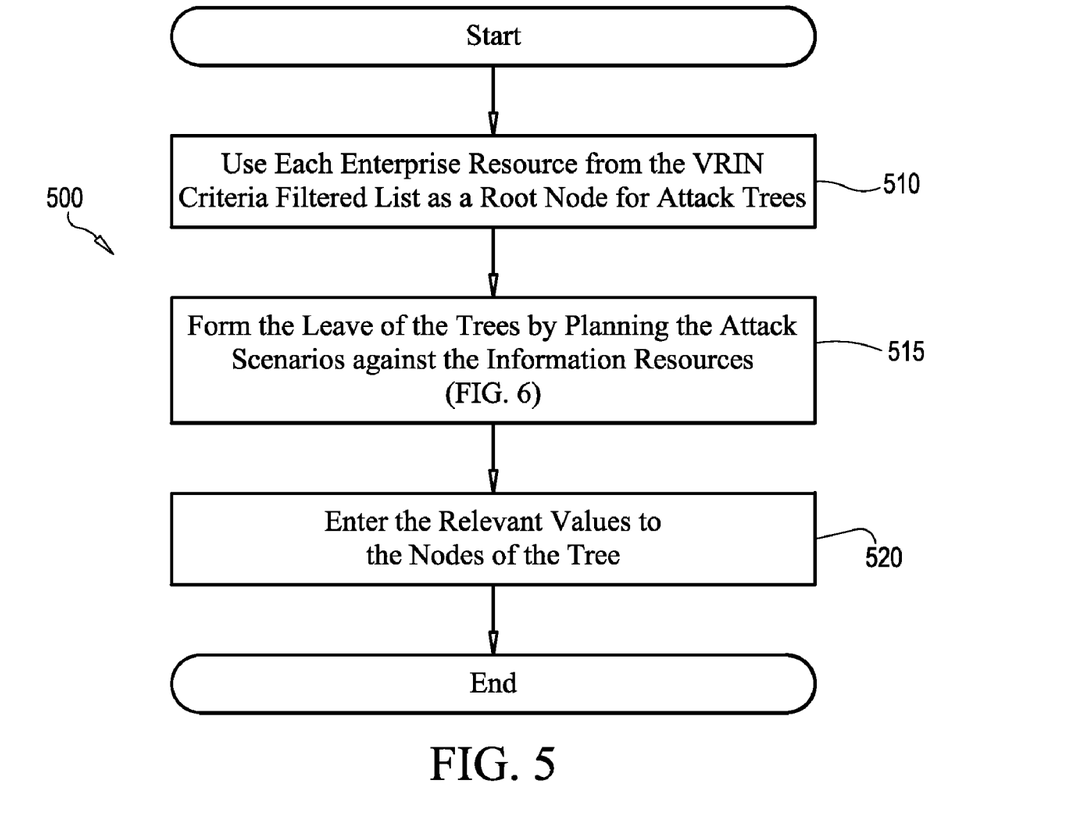
FIG. 5 is a flowchart of an example of process to form an attack tree.

Referring to FIG. 5, a process 500 is an example of a process to form an attack tree. In forming the attack tree, the enterprise resources that successfully pass processing block 230 are used as the root nodes of the attack trees (510). The attack steps against the information assets that are relevant for this resource form the lower layers form the leaves of the tree (515). For the purpose of quantitative analysis numerical values are assigned to the leaf nodes such as, for example, a probability, a cost, and/or an impact of the related attack step (520).

Figure 6:
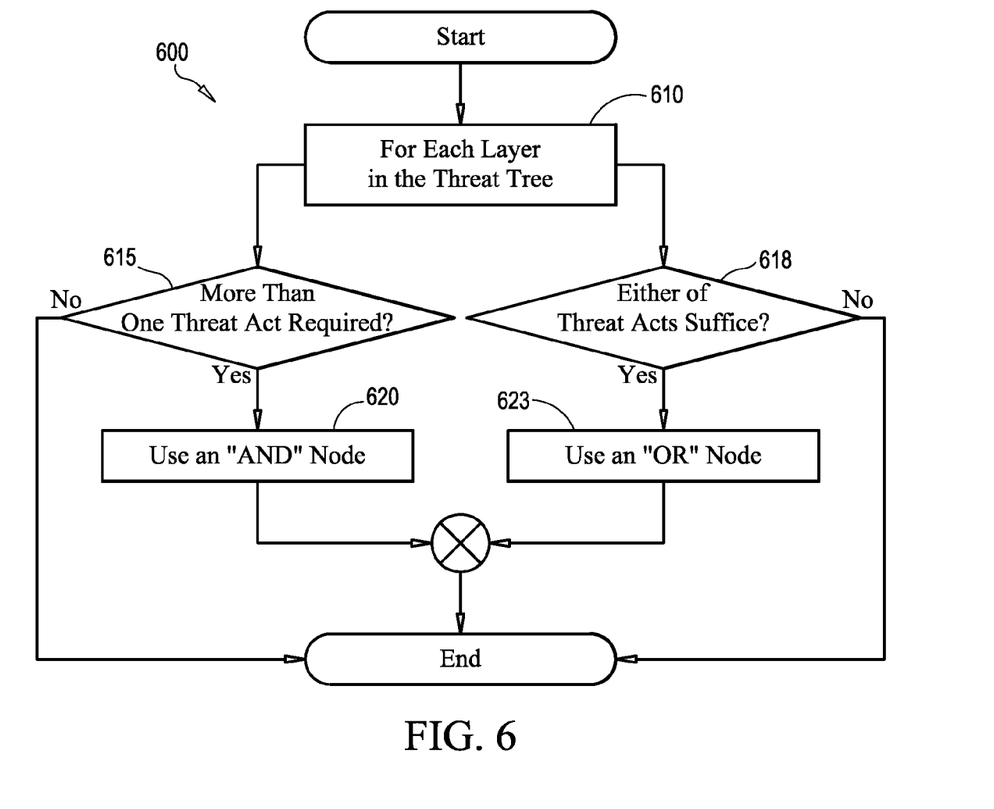
FIG. 6 is a flowchart of an example of a process to form AND/OR nodes within the attack tree.

Referring back to FIG. 4, using the values from processing block 520 and the AND/OR logic outlined in the FIG. 6, the attack scenario steps values are determined (420). For the resultant impact, probability and risk level of an attack or series of attacks against the enterprise resources, a resultant risk value is determined (425).

Referring to FIG. 6, a process 600 is an example of a process to form AND/OR nodes within an attack tree. For each layer in the attack tree (610), it is determined if more than one threat act is required (615) and it is determined if either of the threat acts suffice (618). A logical AND step is used if more than one attacker moves in parallel (620). A logical OR is utilized if the attacker can successfully pass a certain layer within the performance of either one of the attack steps (623).

Figure 7:
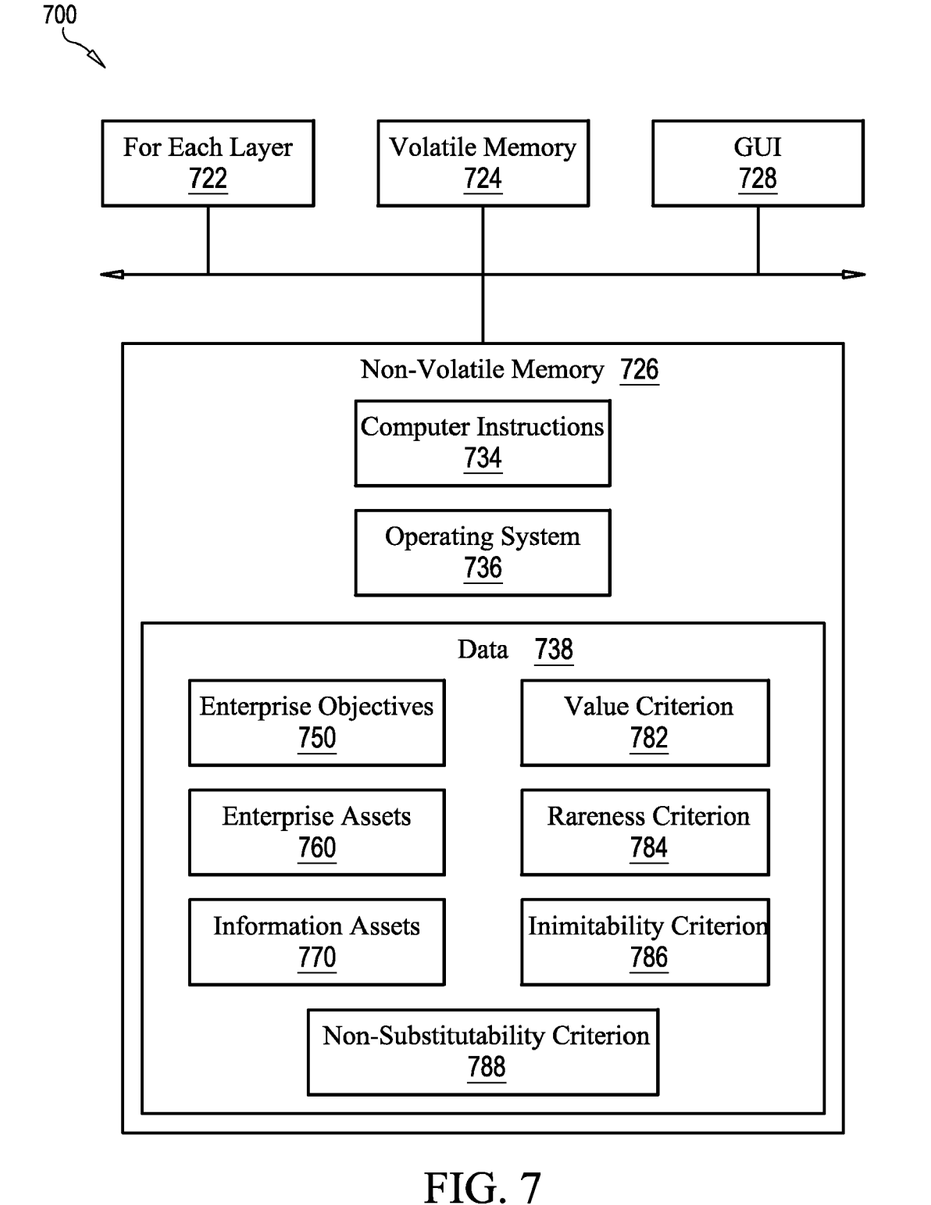
FIG. 7 is a block diagram of an example of a computer on which one or more of the processes of FIGS. 2 to 6 may be implemented.

FIG. 7 is an example of a computer 700, which may be used to execute all or part of the processes 100, 200, 300, 400, 500 and 600. Computer 700 includes a processor 722, a volatile memory 724, a non-volatile memory 726 (e.g., hard disk), for example, and a graphical user interface 728 (e.g., a screen, a mouse, a keyboard, a touch screen and so forth and any combination thereof). Non-volatile memory 726 includes an operating system 736; data 738 (including enterprise objectives 750, enterprise assets 760, information assets 770, a value criterion 782, a rareness criterion 784, a inimitability criterion 786 and non-substitutability criterion 788); and computer instructions 734 which are executed out of volatile memory 724 to perform all or part of processes 100, 200, 300, 400, 500 and 600. The data 738 may be added to the computer 700 using the GUI 728. In one example, the identification of enterprise resources can be implemented using additional criteria added by a user using the GUI 782.

In one example, using the computer 700, the enterprise objective definitions are defined by management and are inputted into the computer 700 using the GUI 728. Usually such enterprise objectives take the form of mid- to long-term measurable goals that set the direction for the enterprise as a whole. Examples of such enterprise objectives can be, for example, achievement of X % revenue growth within the next two quarters, obtaining Y % market share within the end of year Z, cultivation of a learning organization culture, achieving six sigma quality level in three years, leading the innovative position within the industry in research and development.

Afterwards, a team of top management and functional managers define the enterprise resources. Such resources may include all assets, capabilities, organizational processes, brands, information and knowledge base that the company owns, which, for example, may be in the form of tangible or intangible entities. Some examples for the resources may cover; brand names, in-house knowledge of technology, skilled human resources, patents, proprietary technologies, efficient procedures, specialized machinery. The resource categories are identified and stored in the computer 700.

The information system assets of the enterprise are defined by the information systems management team. Such resources may include but are not limited to; servers (database, Internet, e-business, mail, customer relationship management, enterprise resource planning etc), personal computers, thin clients, mobile computing platforms, network infrastructure (such as routers, switches, bridges, hubs), smartcard systems, RFID systems, point of sale systems, automated teller machines, information security appliances (firewalls, intrusion detection/prevention systems, antivirus tools etc.), private branch exchange telephony systems, closed circuit TV systems, data storage infrastructure, and so forth. Thus, the information systems level architecture of the enterprise is inputted to the computer 700 using, for example, the GUI 728 through a submission of a file in an appropriate format that covers this information architecture data.

Afterwards the mapping is performed. Initially the enterprise objectives are mapped to the relevant enterprise resources. As an example if "leading the innovative position within the industry in research and development" was the enterprise objective at hand than the related enterprise resources to be mapped could be, for example, patents owned by the enterprise, proprietary technologies, skilled human resources, and specialized machinery (lab tools).

The VRIN criteria are applied to filter/refine the mapped resources. Assuming, after taking into account the special circumstances of the enterprise, the enterprise resources that pass the VRIN criteria are the "proprietary technologies and the specialized machinery" and the information system assets previously defined are mapped to these filtered list of resources.

In this example the information about the "proprietary technologies" reside within the knowledge database of the research and development (R&D) team or in the computers of the team members (e.g. in the form of software code). Also the "specialized machinery" resource can be a special lab tool used by the R&D team with connections to the R&D intranet. So the related information system assets will be all the computers, servers and network components within the R&D intranet and with direct connections to this intranet as the compromise (e.g., in the form of a security breach or an availability problem such as the downtime of the specialized lab tool) of these resources leads to the compromise of an enterprise resource (proprietary technology or specialized machinery) which directly affects an enterprise objective (leading the innovative position within the industry in research and development). In one example, these steps are repeated for every enterprise objective that has been defined.

An attack tree is formed that takes the filtered enterprise resources as the root nodes and the attack scenario steps related with the relevant information assets as the leaves. Different attributes (like probability, cost, required time and so forth) can be assigned to these other nodes. Those of ordinary skill in the art can also use commercial off-the-shelf available attack tree formation programs. In one example, the formation of the attack tree can be performed with input from a data file that embeds an attack tree model. In another example, additional values and attributes can be defined and added by the user for the leaf node values of the attack tree. Analysis of the aforementioned attack tree is a straightforward implementation of the existing methods of attack tree analysis literature.

By using the successive mapping steps and using the resource filtering of resource based view criteria, an essential list of resources and related information assets are identified. Thus, using this limited (but relevant) list of assets/resources to form the attack trees, the scalability issue of the attack tree analysis is overcome. Also the list of resources/assets pertain resources/assets that are relevant to the fulfillment of enterprise objectives and the results of the analysis is therefore beneficial not only in the technical domain but also for managerial decision making.

The processes described herein (e.g., processes 100, 200, 300, 400, 500 and 600) are not limited to use with the hardware and software of FIG. 7, they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 100, 200, 300, 400, 500 and 600, for example, and to generate output information.

The processes described herein are not limited to the specific embodiments described herein. For example, the processes are not limited to the specific processing order of the process steps in FIGS. 1 to 6. Rather, any of the processing steps of FIGS. 1 to 6 may be re-ordered, combined or removed, performed in parallel or in serial, as necessary, to achieve the results set forth above.

Process steps in FIGS. 1 to 6 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

While the invention is shown and described in conjunction with a particular embodiment having an illustrative architecture having certain components in a given order, it is understood that other embodiments well within the scope of the invention are contemplated having more and fewer components, having different types of components, and being coupled in various arrangements. Such embodiments will be readily apparent to one of ordinary skill in the art. All documents cited herein are incorporated herein by reference. Other embodiments not specifically described herein are also within the scope of the following claims.

What is claimed is:

1. A method comprising:
    storing enterprise objectives in a computer system;
    storing a list of enterprise resources in the computer system;
    mapping the enterprise objectives with the enterprise resources;
    removing enterprise resources from the list of enterprise resources that cannot be mapped to an enterprise objective to form a limited list of enterprise resources;
    filtering the limited list of resources using a value criterion, a rareness criterion, an inimitability criterion and a non-substitutability criterion to form a filtered list of enterprise resources;
    storing the filtered list of enterprise resources in the computer system;
    storing enterprise information assets in the computer system;
    mapping the enterprise information assets with enterprise resources from the filtered list;
    determining a threat analysis using an attack tree using the enterprise resources from the filtered list and the information assets comprising forming the attack tree using a data file that embeds an attack tree model, the attack tree defining possible attacks on the computer system modeled within a tree structure comprising nodal hierarchy allowing the decomposition and analysis of an attack within a number of attack steps, the attack tree using the enterprise resources from the filtered list as root nodes in the attack tree; and
    determining a risk value using the attack tree.

2. The method of claim 1, further comprising identifying the enterprise objectives using mission statements.

3. The method of claim 1, further comprising identifying the enterprise objectives using enterprise goals.

4. The method of claim 1, further comprising storing enterprise resources determined using criteria added to the computer system by a user through a graphical user interface.

5. The method of claim 1 wherein storing enterprise resources comprises storing enterprise resources provided by a user through a graphical user interface.

6. The method of claim 1 wherein storing enterprise information assets in the computer system comprises storing a data file comprising the information assets.

7. The method of claim 1 wherein storing enterprise information assets in the computer system comprises storing enterprise information assets provided by a user through a graphical user interface.

8. The method of claim 1 wherein the mapping of enterprise objectives with enterprise resources comprises mapping the enterprise objectives with enterprise resources provided by a user through a graphical user interface.

9. The method of claim 1 wherein the mapping enterprise resources with enterprise information assets comprises mapping of enterprise resources with enterprise information assets provided by a user using a graphical user interface.

10. The method of claim 1 wherein determining a threat analysis using an attack tree comprises using additional values and attributes for leaf node values of the attack tree that are defined and added by a user through a graphical user interface.

11. An article comprising:
a non-transitory machine-readable medium that stores executable instructions to assess information security vulnerability, the instructions causing a machine to:
store enterprise objectives in a computer system;
store a list of enterprise resources in the computer system;
map the enterprise objectives with the enterprise resources;
remove enterprise resources from the list of enterprise resources that cannot be mapped to an enterprise objective to form a limited list of enterprise resources;
filter the limited list of resources using a value criterion, a rareness criterion, an inimitability criterion and a non-substitutability criterion to form a filtered list of enterprise resources;
store the filtered list of enterprise resources in the computer system;
store enterprise information assets in the computer system;
map the enterprise information assets with enterprise resources from the filtered list;
determine a threat analysis using an attack tree using the enterprise resources from the filtered list and the information assets comprising forming the attack tree using a data file that embeds an attack tree model, the attack tree defining possible attacks on the computer system modeled within a tree structure comprising nodal hierarchy allowing the decomposition and analysis of an attack within a number of attack steps, the attack tree using the enterprise resources from the filtered list as root nodes in the attack tree; and
determine a risk value using the attack tree.

12. The article of claim 11, further comprising instructions causing a machine to identify the enterprise objectives using enterprise goals.

13. The article of claim 11 wherein the identification of enterprise resources can be implemented using additional criteria added to the computer system by a user.

14. The article of claim 11 wherein the identification of enterprise resources can be implemented using a graphical user interface.

15. The article of claim 11 wherein storing enterprise information assets in the computer system comprises storing a data file comprising the information assets.

16. An apparatus, comprising:
circuitry to:
store enterprise objectives in a computer system;
store a list of enterprise resources in the computer system;
map the enterprise objectives with the enterprise resources;
remove enterprise resources from the list of enterprise resources that cannot be mapped to an enterprise objective to form a limited list of enterprise resources;
filter the limited list of resources using a value criterion, a rareness criterion, an inimitability criterion and a non-substitutability criterion to form a filtered list of enterprise resources;
store the filtered list of enterprise resources in the computer system;
store enterprise information assets in the computer system;
map the enterprise information assets with enterprise resources from the filtered list;
determine a threat analysis using an attack tree using the enterprise resources from the filtered list and the information assets comprising forming the attack tree using a data file that embeds an attack tree model, the attack tree defining possible attacks on the computer system modeled within a tree structure comprising nodal hierarchy allowing the decomposition and analysis of an attack within a number of attack steps, the attack tree using the enterprise resources from the filtered list as root nodes in the attack tree; and
determine a risk value using the attack tree.

17. The apparatus of claim 16 wherein the circuitry comprises at least one of a processor, a memory, programmable logic or logic gates.

18. The apparatus of claim 16 wherein the circuitry to map enterprise resources with enterprise information assets comprises circuitry to map enterprise resources with enterprise information assets provided by a user using a graphical user interface.

* * * * *